United States Patent Office 3,019,856
Patented Feb. 6, 1962

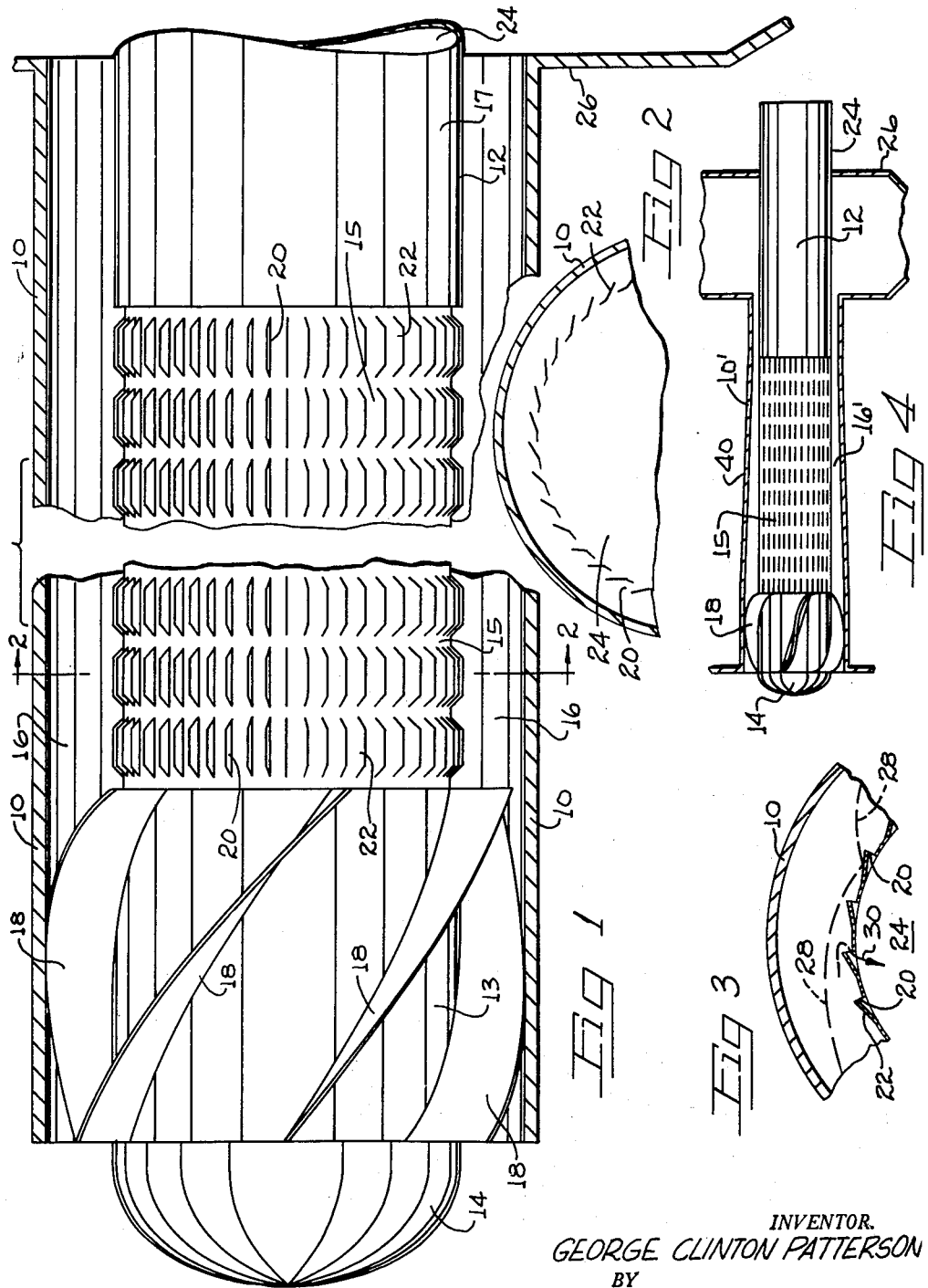

3,019,856
DUST COLLECTOR
George C. Patterson, Dearborn, Mich., assignor to American Radiator & Standard Sanitary Corporation, New York, N.Y., a corporation of Delaware
Filed Dec. 19, 1958, Ser. No. 781,636
2 Claims. (Cl. 183—80)

This invention relates to a dust collector, and particularly to a collector employing centrifugal action and dust particle deflection wall principles for providing increased separation efficiencies.

In the centrifugal separation of dust particles from a dust-laden gas stream there is sometimes employed a relatively large flow tube and a relatively small inner tube arranged to define an annular duct for the dust-laden gas. The gas is drawn through the annular duct past a series of angularly extending vanes which serve to give the gas a whirling or spiralling motion, this spiralling motion serving to cause the heavier dust particles to be centrifugally thrown toward the outer portion of the duct, with the relatively pure gas being disposed in the inner portion of the duct. A relatively small diameter outlet tube is arranged downstream from the vanes so as to receive the clean gas, with the concentrated dust particles flowing into a hopper structure for dust removal purposes.

During passage of the gas through the above described apparatus the gas movement is controller in the inlet and in the outlet, but there is a lack of control in the void space therebetween. Thus there is a turbulence in the gas stream caused by expansion of the gas as it moves into the large open space between the vanes and outlet tube. This expansion of the gas causes the gas and dust particles to intimately mix together in small eddys so as to cause re-entrainment of the separated particles back into the main gas stream. The result is a lowered dust collection efficiency with excessively high pressure drops.

One object of the present invention is to provide a dust collector wherein centrifugal action is employed in such manner as to cause a whirling travel of the gas for efficiently separating the dust particles from the clean gas without tendency of said particles to become re-entrained in the gas stream.

Another object of the invention is to provide a centrifugal dust collector wherein high separating efficiencies are attained without excessive pressure drops.

A further object of the invention is to provide a dust collector wherein substantially laminar flow conditions are attained so as to reduce pressure drops through the collector.

A still further object of the invention is to provide a dust collector wherein the cross sectional area of the flow path for the gas is substantially constant at all points along the collector so as to prevent such expansions or contractions of the gas stream as would result in excessive turbulence and pressure drops.

Another object is to provide a dust collector wherein the gas is closely controlled in its movements at all points within the collector, the arrangement being such as to minimize turbulence.

Another object is to provide a dust collector having wall structure therein defining an annular dusty gas zone and central clean gas zone, the arrangement being such that the gas experiences minimum change in velocity as it travels from the dusty zone into the clean zone.

A further object is to provide a dust collector wherein high centrifugal force values are maintained along the collector length.

An additional object of the invention is to provide a dust collector which obtains the above described advantages in a structure of relatively low cost.

Another object of the invention is to provide a dust collector wherein the components may be manufactured to have comparatively large dimensional tolerances without materially interfering with proper and efficient operation.

A further object of the invention is to provide a dust collector wherein the gas stream is caused to flow in substantially the same direction throughout its passage through the collector, without requiring the clean gas to substantially reverse its direction during separation of the dust particles.

Another object of the invention is to provide a dust collector wherein a single dust collecting stage is effective to efficiently separate the dust from the clean gas so as to avoid the necessity for a second dust separating stage.

Another object is to provide a dust collector which is operable with dust streams having a wide range of dust particle sizes.

Another object of the invention is to provide a dust collector which may be constructed as a relatively short length device, thereby saving space and materials of construction.

Other objects of this invention will appear in the following description and appended claims, reference being had to the accompanying drawings forming a part of this specification wherein like reference characters designate corresponding parts in the several views.

In the drawings:

FIG. 1 is a sectional view of one embodiment of the invention, with certain internal parts being shown in elevation for illustration purposes;

FIG. 2 is a sectional view on a reduced scale taken on line 2—2 in FIG. 1; and

FIG. 3 is an enlarged sectional view of a portion of the structure shown in FIG. 2.

FIG. 4 is a view similar to FIG. 1 but showing another embodiment of the invention on a reduced scale.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a dust collector comprising an outer cylindrical tube 10 and an inner cylindrical tube 12 formed in three sections 13, 15 and 17. The upstream section 13 of tube 12 is closed by a cap 14 so that flow of dust-laden gas into the collector is through the annular duct 16 defined between tubes 10 and 12. In operation, as the dust-laden gas enters dusty gas duct 16 it encounters the angularly directed vanes 18 which give the gas a swirling or spinning motion.

It will be understood that a suitable blower means (not shown) is provided for drawing or propelling gas into the vanes 18 so as to provide the desired axial flow velocity component, the centrifugal or spinning component of velocity being provided by the vanes 18 so as to form a generally spiral stream of dust-laden gas issuing from the vanes. As the dust-laden gas moves downstream from the vanes 18 it encounters the axially spaced sets of openings 20 formed in circumferential alignment around tube section 15; these openings are defined by louvres or baffles 22, said louvres or baffles being directed out of the plane of the tube section 15 along common sides of openings 20 as shown in FIG. 3. The spaced sets of openings 20 are separated by tube sections 15 of uninterrupted contour. The relatively pure gas passes through the openings 20 into the central clean gas duct 24 defined by tube 12, and the concentrated dust particles with a relatively small quantity of gas pass through the annular duct 16 into the conventional hopper structure 26, it being appreciated that tube 12 extends entirely through the hopper structure, being sealed therefrom so as to discharge its clean gas a point remote from the hopper structure. It will also be appreciated that a proportionate part of the pure gas passes through the first set of openings 20 and that other proportionate parts pass through subsequent sets of openings 20.

It will be understood that the heavier dust particles are separated from the gas stream by the centrifugal influence set up by vane 18. Thus the gas issuing from vane 18 has the heavier dust particles thrown outwardly adjacent the inner surface of tube 10, while the portion of the gas stream adjacent the outer surface of tube 12 has a quantity of finer dust particles therein. The finer dust particles strike the louvres 22 so as to be deflected toward the surface of tube 10 in the general manner shown by the dotted lines 28. The continual deflection of the finer dust particles achieved with the louvres 22 operates to maintain said particles adjacent the inner surface of tube 10 so as to cause them to be discharged into the dirt take-off hopper 26 along with the heavier dust particles. A relatively small quantity of very fine dust particles are of course carried along with the pure gas so as to flow through openings 20 as indicated by dotted arrow 30. However, the number of these very fine particles is considerably reduced as compared with the number of dust particles flowing through conventional centrifugal separators. In actual practice separation efficiencies of upwards of 90 percent have been achieved on dust-laden gas streams having comparatively small dust particles, as for example five microns.

High separating efficiencies of the illustrated construction are in large part due to the design feature wherein the annular flow duct 16 provides an "air flow control" zone having the ability to prevent such velocity changes in the gas stream as would cause excessive turbulence and resultant dust particle re-entrainment. If louvred section 15 were not employed the dusty gas would be uncontrolled in its movement after leaving vanes 18; as a result there would be considerable expansion of the gas stream, with resultant turbulence and dust particle re-entrainment.

The high separating efficiency of the illustrated construction is enhanced by reason of the fact that the upstream portion of annular duct 16 is of substantially the same cross sectional area as the upstream portion of the central duct 24 defined by tube 12. This characteristic enhances the ability of the flow control wall surfaces to maintain substantially laminar flow conditions as the gas passes through the openings 20, it being noted in this regard that the gas is thereby prevented from expanding as it would if duct 24 were made substantially larger than duct 16. Such an expansion would of course cause a turbulent action adjacent the openings 20 which would tend to cause the separated dust particles to become re-entrained in the main gas stream so as to be carried along with the gas in duct 24. However, by constructing the tubes 10 and 12 in such diameters that the ducts 16 and 24 are of substantially the same cross sectional area this undesired expansion of the gas is prevented or minimized and there is thus no disturbance of the laminar flow such as would cause re-entrainment of the separated dust particles.

It should also be noted that the gas flows in a spiral direction through the apparatus while maintaining its general direction of flow axially, without any reversal in direction such as is required in certain types of prior art constructions. By maintaining the gas stream in generally the same direction of flow throughout its movement, laminar flow conditions are obtained so as to reduce pressure drops through the collector, this reduction in pressure drop being achieved while still maintaining a high separation efficiency due to the presence of the louvred section 15.

The construction shown in FIG. 4 is similar in many respects of the FIG. 1 construction, and similar reference numerals are employed wherever applicable. In the FIG. 4 construction the portion 40 of tube 10' in radial registry with louvred section 15 is made with a slight downstream taper so as to have the shape of a conical frustum. The taper of portion 40 may be varied somewhat, but in an illustrative construction portion 40 is constructed with a length of seventeen inches, an inlet diameter of eight and one fourth inches, and an outlet diameter of six and one half inches.

The purpose in tapering portion 40 is to maintain high centrifugal force values at all points along the length of section 15. In this connection it will be appreciated that the volume of dirty gas surrounding the downstream portion of section 15 is considerably less than the dirty gas volume surrounding the upstream portion of section 15, so that the downstream annular volume must be reduced in order to maintain high centrifugal force values. Thus, as the dirty gas leaves vanes 18 it may have a relatively high centrifugal force value adjacent the inner surface of tube 10', as for example three hundred G's. During travel of the dirty gas around the surface of section 15 a major portion of the gas passes through the louvred openings into the clean gas duct; as the dirty gas nears the annular zone surrounding the last louvres its volume is considerably reduced. If the annular zone is of the same cross section throughout its length the reduced volume of gas decreases in velocity with a consequent reduction in the centrifugal forces exerted on the dust particles. Howeber by tapering the outer tube 10 as shown the centrifugal velocity can to a certain extent be maintained so as to maintain high centrifugal forces on the dust particles, with resultant increases in separation efficiency, particularly of the fine particles.

In each of the illustrated constructions the number of louvres may be varied considerably without materially changing the separation efficiencies or pressure drops. However, best results have been obtained with the louvres extending in axial directions rather than at angles to the tube axis. The best efficiencies are obtained using louvred openings, but beneficial results may also be achieved using the openings 20 without the louvres. In this connection, it appears that maintenance of substantially laminar flow (by employing the continuous annular duct 16 and central duct 24) prevents turbulence, dust particle re-entrainment and excessive pressure drops.

The apparatus may be constructed to have a relatively short length so as to economize on space and materials. Also, a plurality of the units may be grouped together in a bank for receiving a supply of dust-laden gas from a common header and discharging the dust particles into a common hopper, the savings in space and materials of course being proportional to the numbers of units employed in each bank.

It wil be understood that minor variations in structure and arrangement may be made in the unit without departing from the spirit of the invention as defined in the appended claims.

I claim:

1. In a centrifugal separator for removing particulate materials from gaseous fluid media, the combination of a first elongated cylindrical tube of substantially constant diameter along its length and open interiorly to the free flow of gas therein, said first tube being closed at its entrance end and open at its exit end, a second elongated cylindrical tube surrounding said first tube in coaxial relation thereto, said first and second tubes defining an annular dusty gas duct therebetween, means in said annular dusty gas duct for imparting a swirling motion to gas passed therethrough, said first tube having a plurality of axially spaced sets of circumferentially aligned, elongated openings therein forming an elongated gas outlet zone, said sets being axially spaced from each other by tube sections of uninterrupted contour, each of said elongated openings being axially oriented in its major dimension on the periphery of said first tube, each of said elongated openings having a radially outwardly extending baffle formed along common sides thereof, said swirling motion imparting means being adapted to direct the gas flowing through said annular gas passage in a swirling motion to flow first over said baffles and thence across said openings, and said second elongated tube gradually tapering from a first larger diameter at the front end of said gas outlet zone to a smaller diameter at the rear end of said gas outlet zone of said first tube to form a gas outlet zone between said first and second tubes of gradually decreasing cross section, and a dust collection chamber connected to the exit end of said second tube and the first tube extending through said dust collection chamber and sealed therefrom, whereby particulate materials suspended in a gas stream passing through said annular dusty gas duct are centrifugally thrown outwardly against said second tube and further by contacting said baffles, and a proportionate part of the gas is diverted in its direction of flow around said baffles and into said elongated openings adjacent the front end of said gas outlet zone and the remaining gas is retained at its original centrifugal velocity by passing into a decreasing volumetric zone of said gas outlet zone, passing out through said remaining elongated openings.

2. In a non-rotary centrifugal separator for removing particulate materials from gaseous fluid media containing the same, and having an outer tube open at one end and an inner tube closed at one end to define an annular gas whirling chamber therebetween, with means in said whirling chamber for imparting a spiraling rotary motion to a gas stream moving therein, the improvement of a gas outlet zone formed in said inner tube and comprising a plurality of axially spaced sets of openings, said sets each comprising a plurality of elongated openings being aligned in their major dimensions with the axis of said inner tube and each of said sets of openings comprising a plurality of openings uniformly spaced in circumferential alignment on the periphery of said inner tube, each of said sets being spaced from the next adjacent set by an unbroken portion of said inner tube, and each of said elongated openings having a radially outwardly extending baffle formed along a common side thereof, the means in said swirling chamber being adapted to direct the gas flowing through the annular gas passage in a direction flowing first over the baffles and thence across said openings, whereby light particulate materials will be projected away from entrance into said openings by contact with said baffles.

References Cited in the file of this patent

UNITED STATES PATENTS

| | | |
|---|---|---|
| 1,917,310 | Lesage | July 11, 1933 |
| 2,287,652 | Van Tongeren | June 23, 1942 |

FOREIGN PATENTS

| | | |
|---|---|---|
| 1,019,343 | France | Oct. 29, 1952 |
| 1,105,212 | France | June 29, 1955 |
| 700,297 | Great Britain | Nov. 25, 1953 |